US009423994B2

(12) United States Patent
Suresh et al.

(10) Patent No.: US 9,423,994 B2
(45) Date of Patent: Aug. 23, 2016

(54) HIERARCHICAL DISPLAY

(75) Inventors: Ashwin Suresh, Pompano Beach, FL (US); Juan Rivera, Pleasanton, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 1117 days.

(21) Appl. No.: 13/402,179

(22) Filed: Feb. 22, 2012

(65) Prior Publication Data
US 2013/0219012 A1   Aug. 22, 2013

(51) Int. Cl.
| G06F 15/16 | (2006.01) |
| G09G 5/00 | (2006.01) |
| G06F 3/14 | (2006.01) |
| G09G 5/14 | (2006.01) |
| G06F 3/01 | (2006.01) |

(52) U.S. Cl.
CPC ............ G06F 3/1462 (2013.01); G06F 3/013 (2013.01); G09G 5/14 (2013.01); *G06F 2203/04803* (2013.01); *G09G 2320/0686* (2013.01); *G09G 2320/0693* (2013.01); *G09G 2320/103* (2013.01); *G09G 2340/0407* (2013.01); *G09G 2340/0464* (2013.01); *G09G 2340/12* (2013.01); *G09G 2340/14* (2013.01); *G09G 2354/00* (2013.01); *G09G 2370/022* (2013.01)

(58) Field of Classification Search
CPC .......... G09G 5/14; G06F 3/1462; G06F 3/013
USPC ............................. 709/217; 345/418; 715/740
See application file for complete search history.

(56) References Cited

U.S. PATENT DOCUMENTS

| 5,978,835 | A  | * | 11/1999 | Ludwig | ................ | G06Q 10/10 348/E7.081 |
| 6,711,297 | B1 | * | 3/2004 | Chang | ..................... | G06T 1/00 375/E7.065 |
| 6,812,941 | B1 | * | 11/2004 | Brown | ................ | G06F 17/30905 707/E17.121 |
| 7,792,898 | B2 | * | 9/2010 | Lu | ........................ | G06F 3/1415 345/544 |
| 8,225,224 | B1 | * | 7/2012 | Robertson | ............ | G06F 3/0481 715/767 |
| 8,643,680 | B2 | * | 2/2014 | Baldwin | ................ | G06F 3/013 345/156 |

(Continued)

FOREIGN PATENT DOCUMENTS

WO   WO 2010144096 A1 * 12/2010 ............... G09G 5/00

OTHER PUBLICATIONS

U. Rauschenbach, "Progressive Image Transmission Using Levels of Detail and Regions of Interest".*

(Continued)

*Primary Examiner* — David Lazaro
*Assistant Examiner* — Robert Shaw
(74) *Attorney, Agent, or Firm* — Banner & Witcoff, Ltd.

(57) ABSTRACT

Systems and methods that provide a hierarchical display to a user based on a position of the user's focus are described herein. The position of the user's focus may be determined by tracking, for example, a position of the user's eyes, a position of a mouse cursor within the display, a position of an application window within the display, or a combination thereof. Based on the position of the user's focus, the display may be divided into multiple display regions, and the display regions may be ranked, such as by prioritizing a display region that the user is focusing on. Display quality (e.g., transmission rate, image resolution, degree of image compression, etc.) of the display regions may be determined based on the rank of the display regions, thereby providing higher display/image quality to regions based on what the user is actively looking at.

20 Claims, 16 Drawing Sheets

(56) References Cited

U.S. PATENT DOCUMENTS

| | | | | |
|---|---|---|---|---|
| 2002/0057295 | A1* | 5/2002 | Panasyuk | G06F 9/4443 715/804 |
| 2002/0167531 | A1* | 11/2002 | Baudisch | G06F 3/1438 345/611 |
| 2004/0120591 | A1* | 6/2004 | Brower | H04N 19/63 382/240 |
| 2005/0235214 | A1* | 10/2005 | Shimizu | G06F 3/0481 715/740 |
| 2006/0048062 | A1* | 3/2006 | Adamson | G09G 5/363 715/760 |
| 2006/0072833 | A1* | 4/2006 | Ma | G06K 9/3241 382/232 |
| 2008/0018582 | A1* | 1/2008 | Yang | G06F 3/1415 345/98 |
| 2008/0250345 | A1* | 10/2008 | Li | G06F 17/30994 715/803 |
| 2009/0003270 | A1* | 1/2009 | Schwenke | H04N 21/23439 370/329 |
| 2009/0125838 | A1* | 5/2009 | Bhogal | H04L 67/38 715/788 |
| 2009/0183085 | A1* | 7/2009 | Pasetto | G06F 3/1431 715/744 |
| 2009/0210817 | A1* | 8/2009 | Schmieder | G06F 3/1462 715/781 |
| 2009/0282359 | A1* | 11/2009 | Saul | G06F 3/0481 715/784 |
| 2010/0088623 | A1* | 4/2010 | Ichino | G06F 3/0481 715/766 |
| 2011/0214063 | A1* | 9/2011 | Saul | G06F 3/0481 715/740 |
| 2012/0146891 | A1* | 6/2012 | Kalinli | H04N 19/33 345/156 |
| 2012/0306737 | A1* | 12/2012 | Sweet | G06F 3/1454 345/156 |
| 2013/0013617 | A1* | 1/2013 | Cai | G06F 17/30336 707/746 |
| 2013/0321265 | A1* | 12/2013 | Bychkov | G06F 3/017 345/156 |

OTHER PUBLICATIONS

Rogge et al, Region-of-interest-based progressive transmission of gray-scale images across the Internet, Proceedings of SPIE—The International Society for Optical Engineering 3648 Dec. 1998.*

May 14, 2013 International Search Report Issued in International Application No. PCT/US2013/026708.

Rivera, "HDX Learning Series—Queuing and Tossing," The Citrix Blog, Aug. 12, 2009, printed Nov. 1, 2011, pp. 1-4.

OpenNI™, http://openni.org/, printed Nov. 1, 2011, pp. 1-2.

OpenNI™ User Guide, printed Nov. 1, 2011, pp. 1-44.

Tobii Technology, "The Basics of Eye Tracking," tobii.com/en/eye-tracking-integration/global/.../the-basics-of-eye-tracking/, printed Dec. 15, 2011, pp. 1-2.

User Vision, "Eye-tracking the Kinect," uservision.co.uk/.../eye-tracking-game-playing-experience-highlights-op/, Jul. 13, 2011, printed Dec. 15, 2011, pp. 1-3.

"Chroma subsampling," Wikipedia, printed Dec. 15, 2011, pp. 1-9.

"H.264/MPEG-4 AVC," Wikipedia, printed Dec. 15, 2011, pp. 1-14.

* cited by examiner

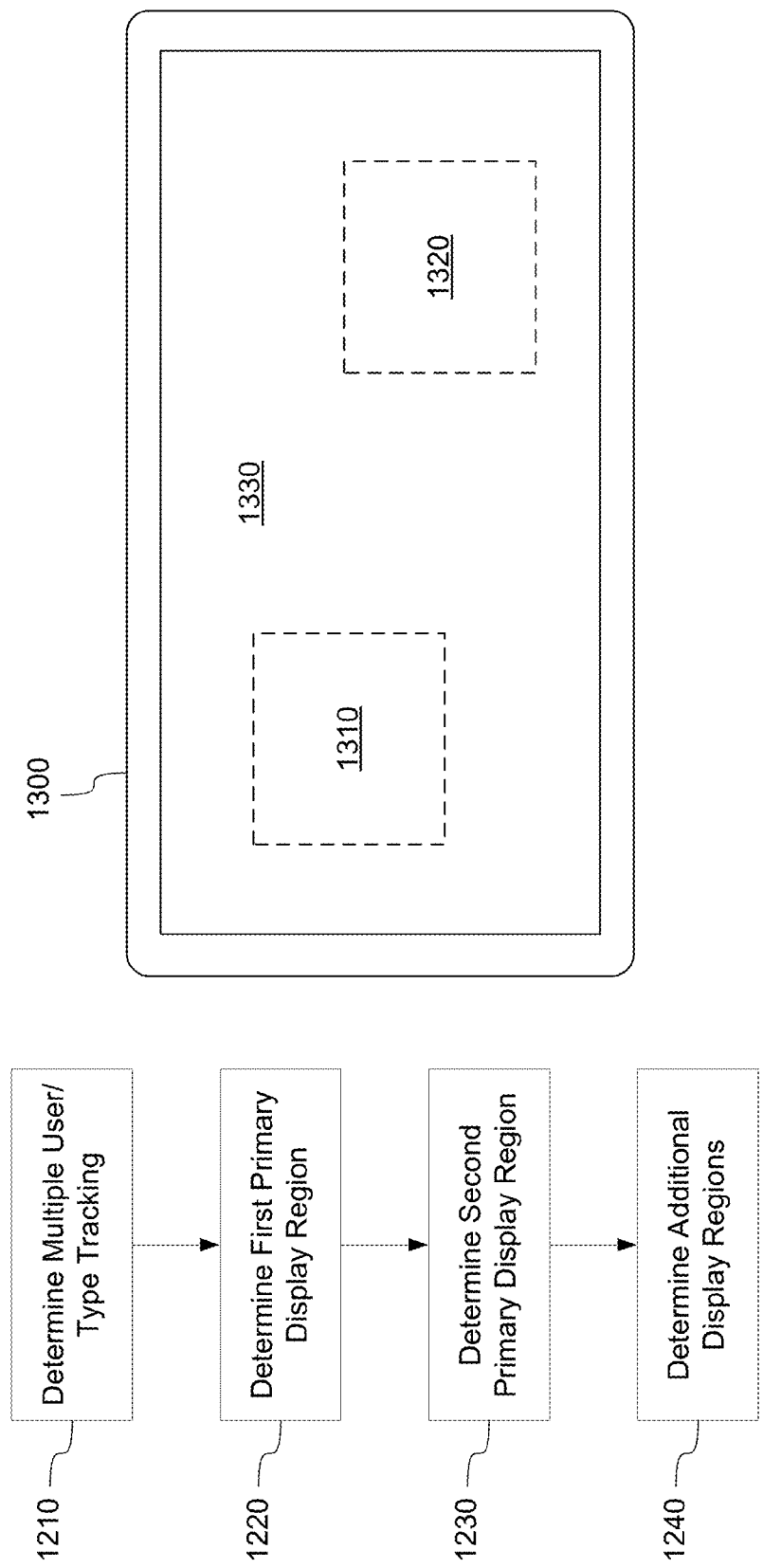

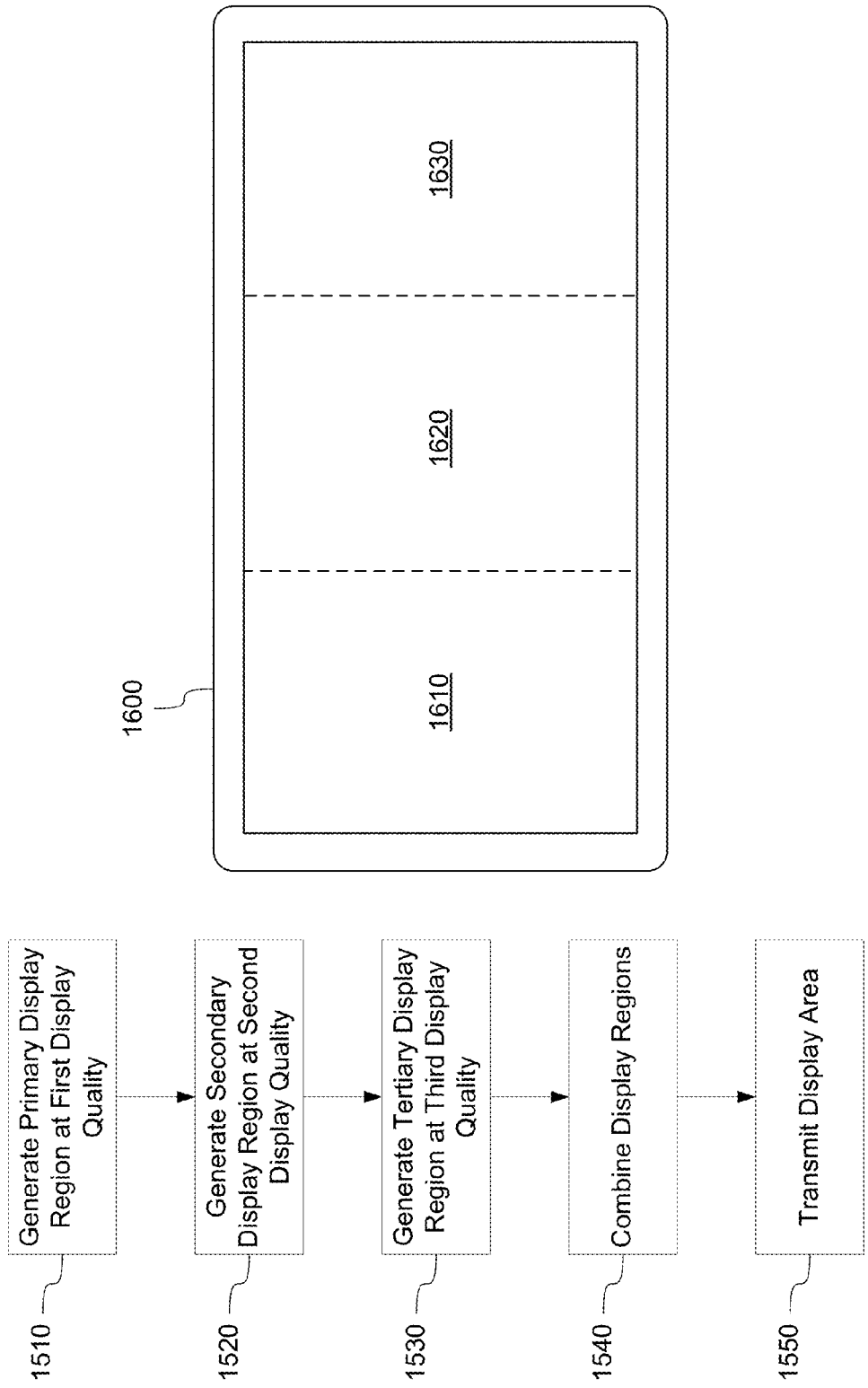

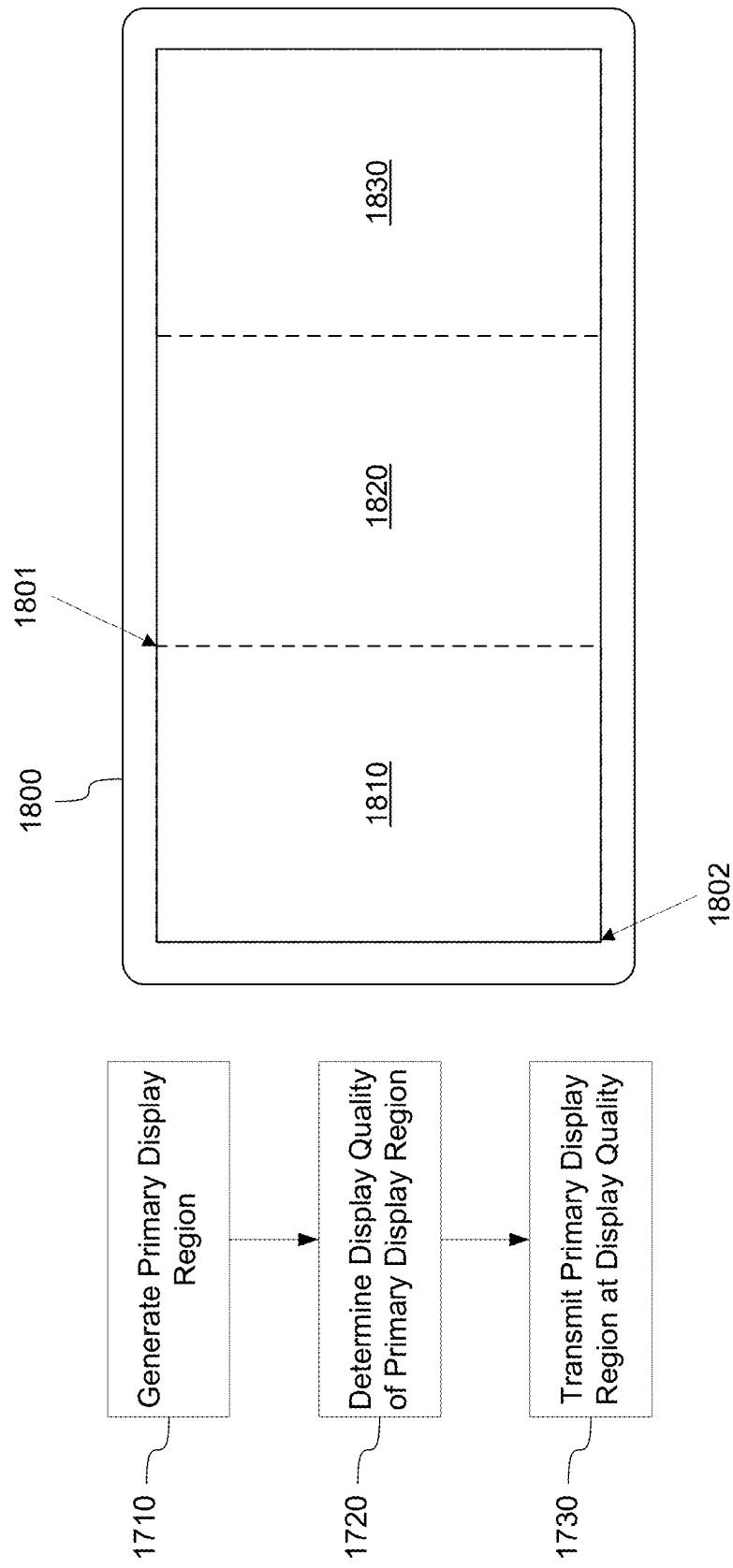

HIERARCHICAL DISPLAY

FIELD

Aspects described herein are related to remote computer access and virtual desktop infrastructures. More specifically, aspects described herein provide methods and systems for reducing bandwidth required for video display generation when a client device accesses a hosted resource (e.g., a virtual desktop, remote application, and the like) on a remotely located host device, based on a position of a user's focus within a visible display area.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. Multi-server desktop virtualization systems often include additional computing devices and/or shared storage to provide a common system management portal and to maintain global state information. Such systems often use the external shared storage, along with database and enterprise server software within the virtualization servers, to manage the system.

In virtualized desktop systems, significant amounts of data, such as data used to generate images of a virtual desktop at a client computing device, are transmitted from a remote server administering the virtual desktop to the client computing device displaying the virtual desktop. In existing systems, updates for the virtual desktop are periodically transmitted for an entire virtual desktop display area, tying up large amounts of network resources.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe a system that delivers display image data to a client device efficiently and cost-effectively, while maintaining a high degree of image quality. Aspects include a hierarchical display system and method that includes receiving, from a client device, information identifying a position of a user's focus in a display area, identifying a primary display region of the display area, the primary display region being associated with the position of the user's focus in the display area, setting the display quality of the primary display region higher than a display quality of a secondary display region different from the primary display region, and transmitting, to the client device, at least one of the primary display region and the secondary display region. In some aspects, the display quality of the primary display region may include at least one of an image resolution, an image transmission rate, and a degree of image compression.

In additional aspects, the hierarchical display system and method include identifying a tertiary display region of the display area, wherein the secondary display region is closer to the primary display region than the tertiary display region is to the primary display region, and setting the display quality of the secondary display region higher than a display quality of the tertiary display region. The hierarchical display system and method may further include detecting an image change in the secondary display region, and in response to detecting the image change in the secondary display region, preventing transmission of an updated frame of the secondary display region. Similarly, the hierarchical display system and method may also include detecting an image change in the primary display region, and in response to detecting the image change in the primary display region, performing the transmitting step.

The hierarchical display system and method may also include receiving information identifying the position of the user's focus includes receiving the information in response to a change in the position of the user's focus from a first display region to a second display region different from the first display region, and identifying the primary display region of the display area includes identifying the second display region as the new primary display region. The system and method may also include determining that the position of the user's focus has changed to a new display region in the display area, wherein identifying the primary display region of the display area includes identifying the new display region as the primary display region. Determining that the position of the user's focus has changed to the new display region in the display might include determining that a position of an input device indicator associated with the user's focus has changed to a position in the new display region in the display area. Determining that the position of the user's focus has changed to the new display region in the display area might also include determining that at least a portion of an application window is within the new display region.

In further aspects, the hierarchical display system and method may include receiving, from the client device, information identifying the position of a second user's focus in the display area, identifying a second primary display region of a display area, the second primary display region being associated with the position of the second user's focus, and setting the display quality of the second primary display region to the display quality of the primary display region.

BRIEF DESCRIPTION OF THE DRAWINGS

Figure 1:
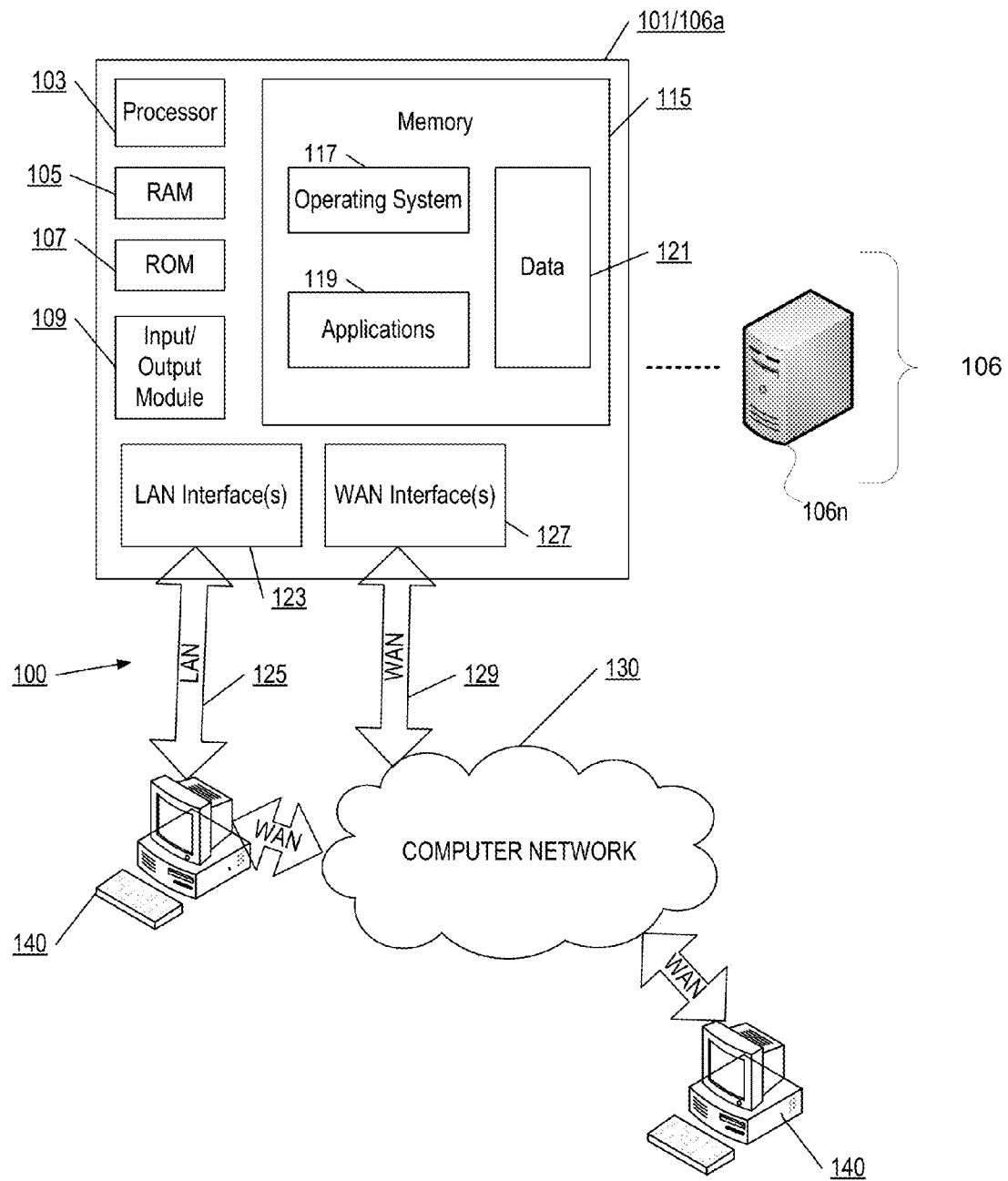

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
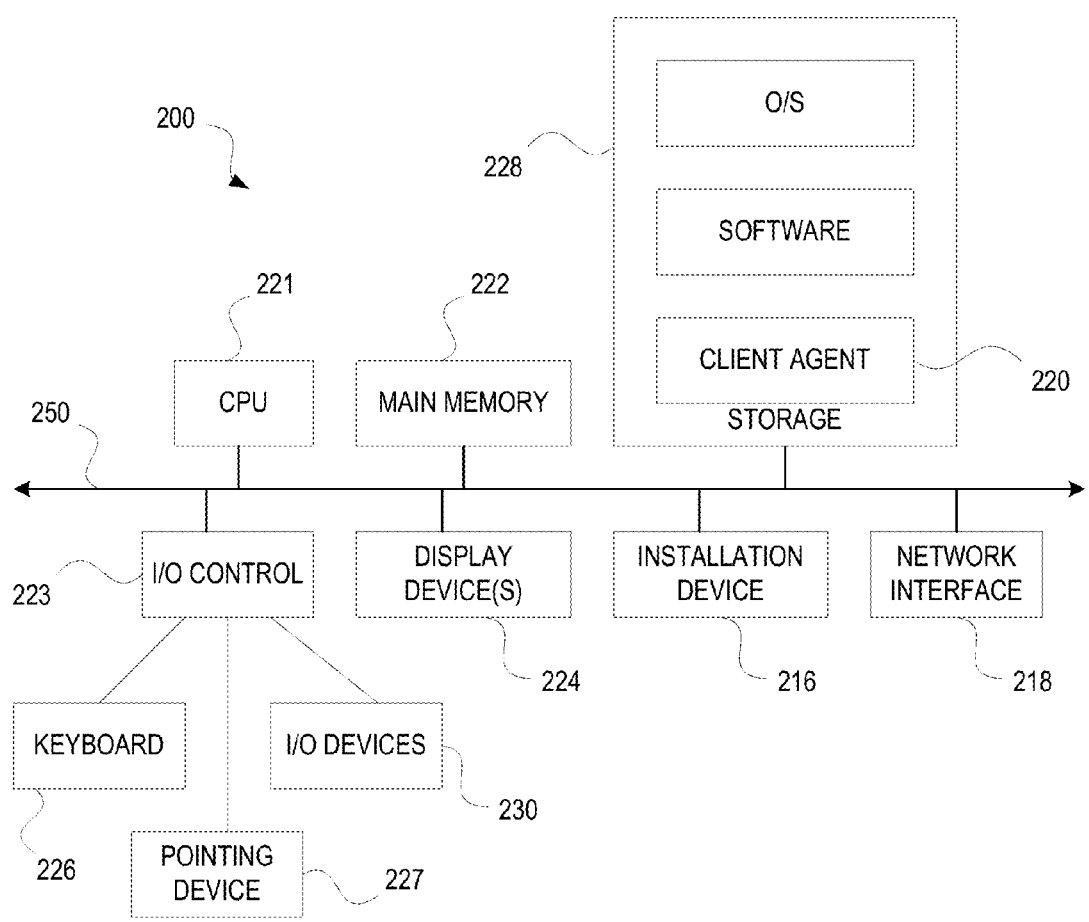

FIG. 2 illustrates a device that may be used in accordance with one or more illustrative aspects described herein.

Figure 3:
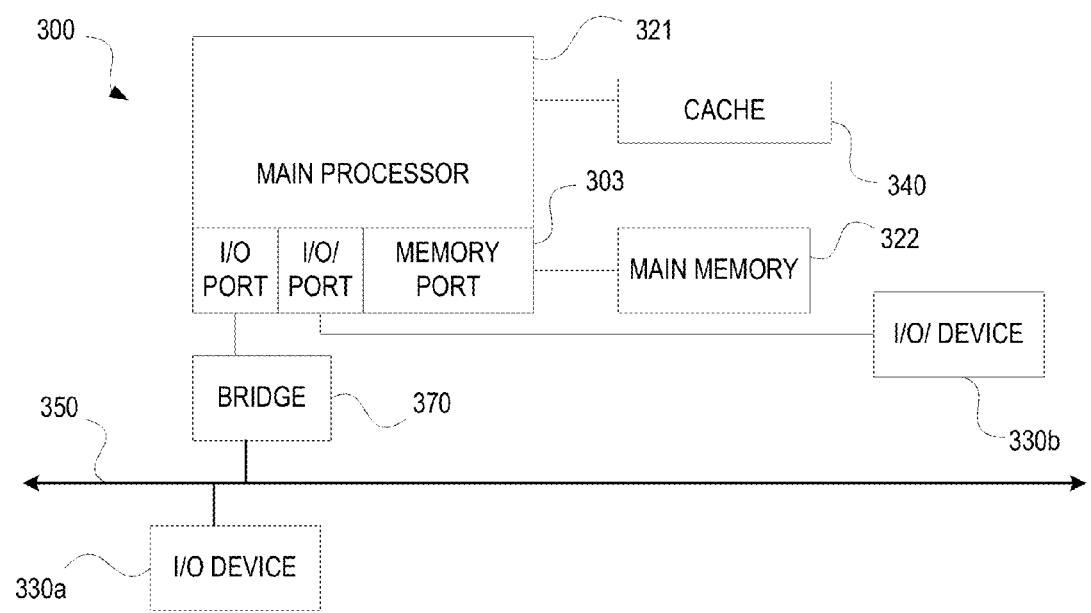

FIG. 3 illustrates a device that may be used in accordance with one or more illustrative aspects described herein.

Figure 4:
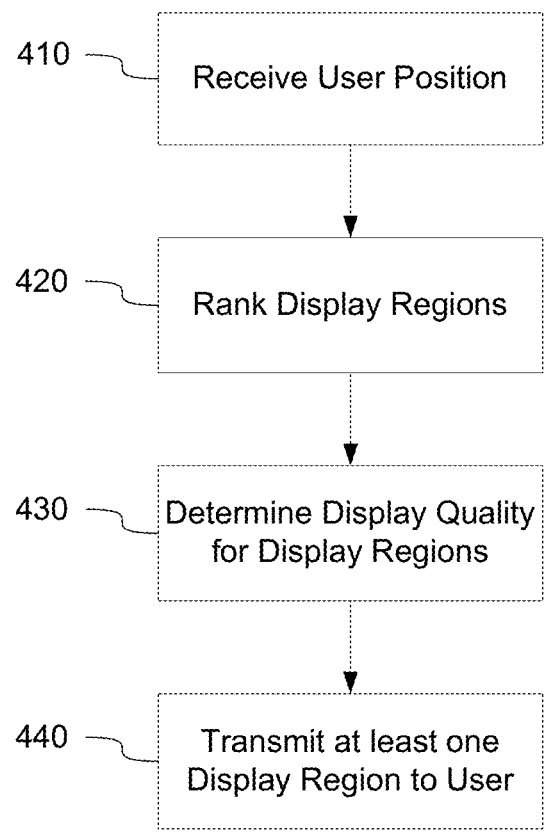

FIG. 4 illustrates an example overview method of providing a hierarchical display in accordance with one or more illustrative aspects described herein.

Figure 5:
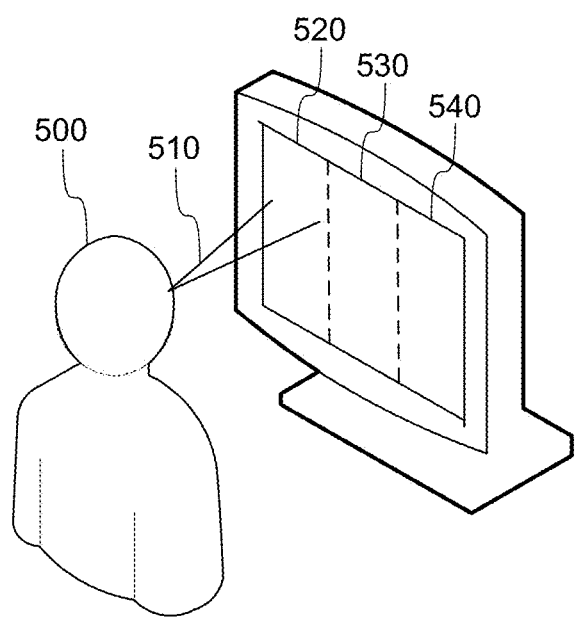

FIG. 5 illustrates an example of a user position in accordance with one or more illustrative aspects described herein.

Figure 6:
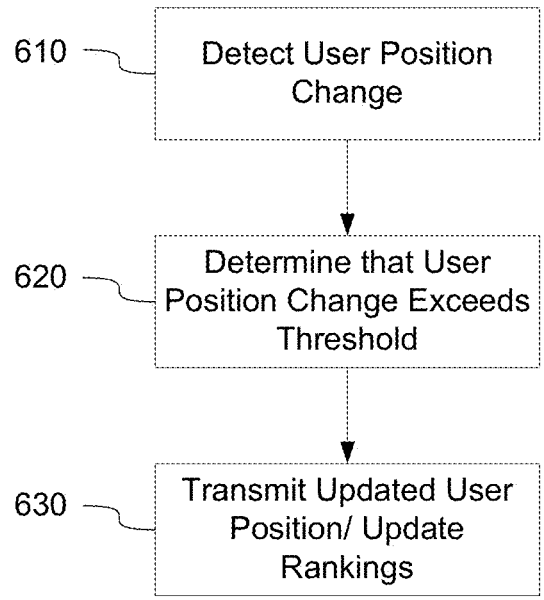

FIG. 6 illustrates an example method of detecting user position change in accordance with one or more illustrative aspects described herein.

Figure 7:
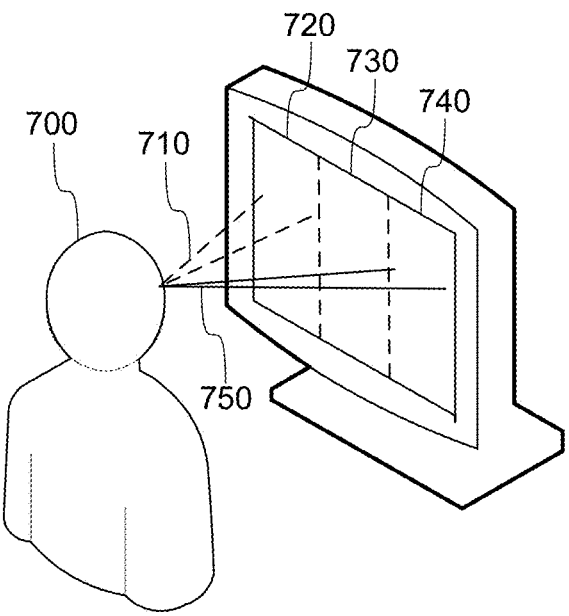

FIG. 7 illustrates an example of a user position change in accordance with one or more illustrative aspects described herein.

Figure 8:
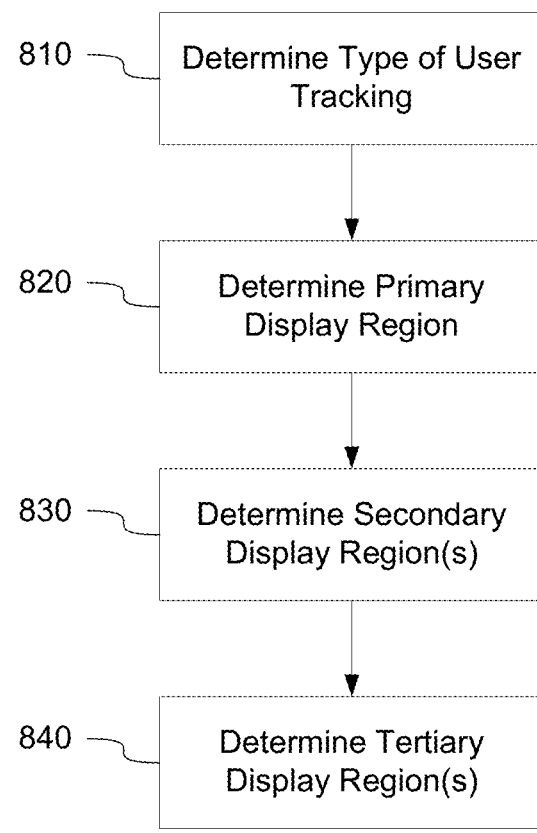

FIG. 8 illustrates an example method of ranking display regions in accordance with one or more illustrative aspects described herein.

Figure 9:
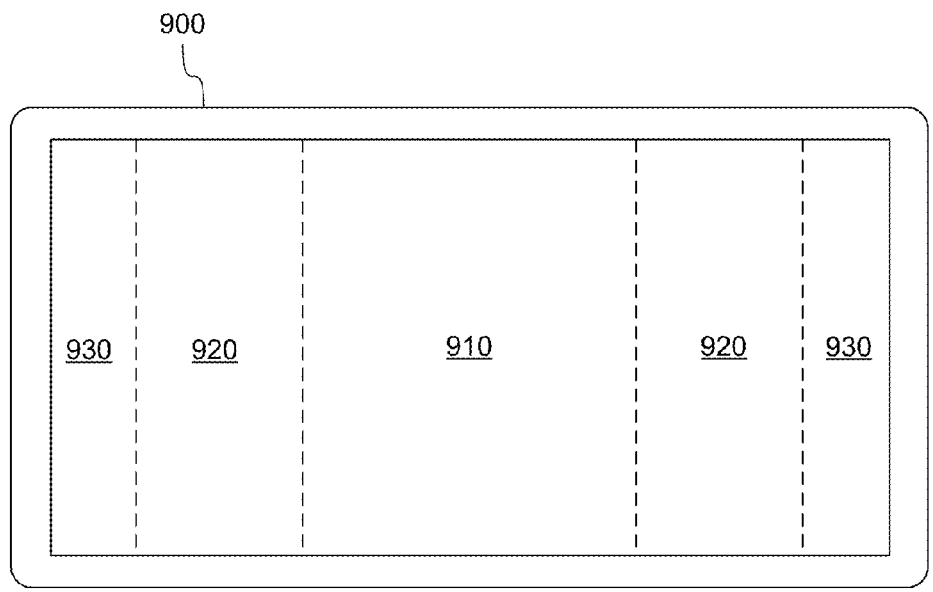

FIG. 9 illustrates an example display area including a plurality of display regions in accordance with one or more illustrative aspects described herein.

Figure 10:
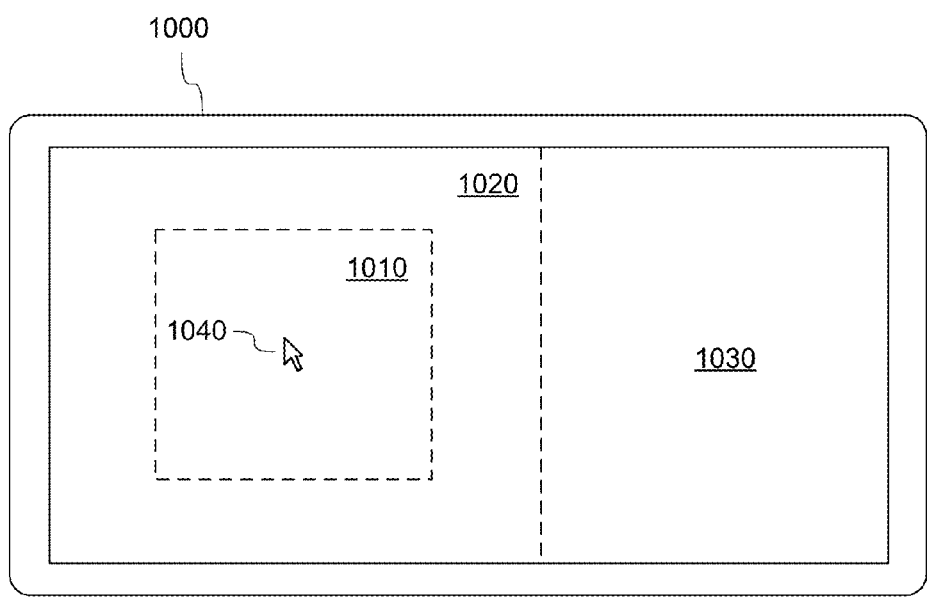

FIG. 10 illustrates another example display area including a plurality of display regions in accordance with one or more illustrative aspects described herein.

Figure 11:
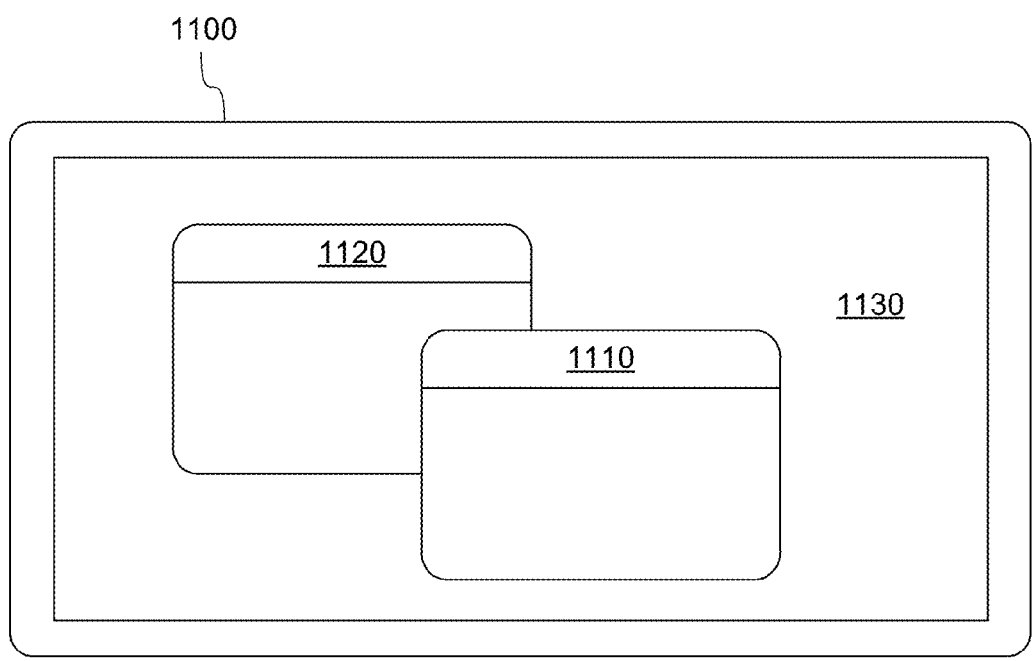

FIG. 11 illustrates an additional example display area including a plurality of display regions in accordance with one or more illustrative aspects described herein.

FIG. 12 illustrates an example method of determining a plurality of primary display regions in accordance with one or more illustrative aspects described herein.

FIG. 13 illustrates an example display area including a plurality of primary display regions in accordance with one or more illustrative aspects described herein.

Figure 14A:
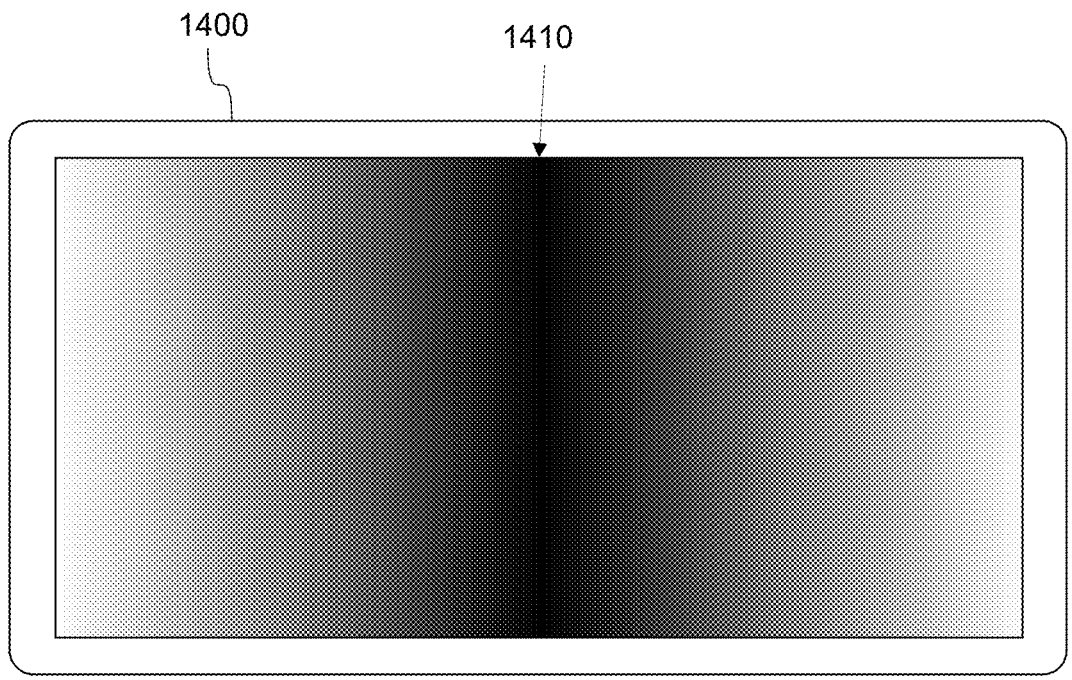
Figure 14B:
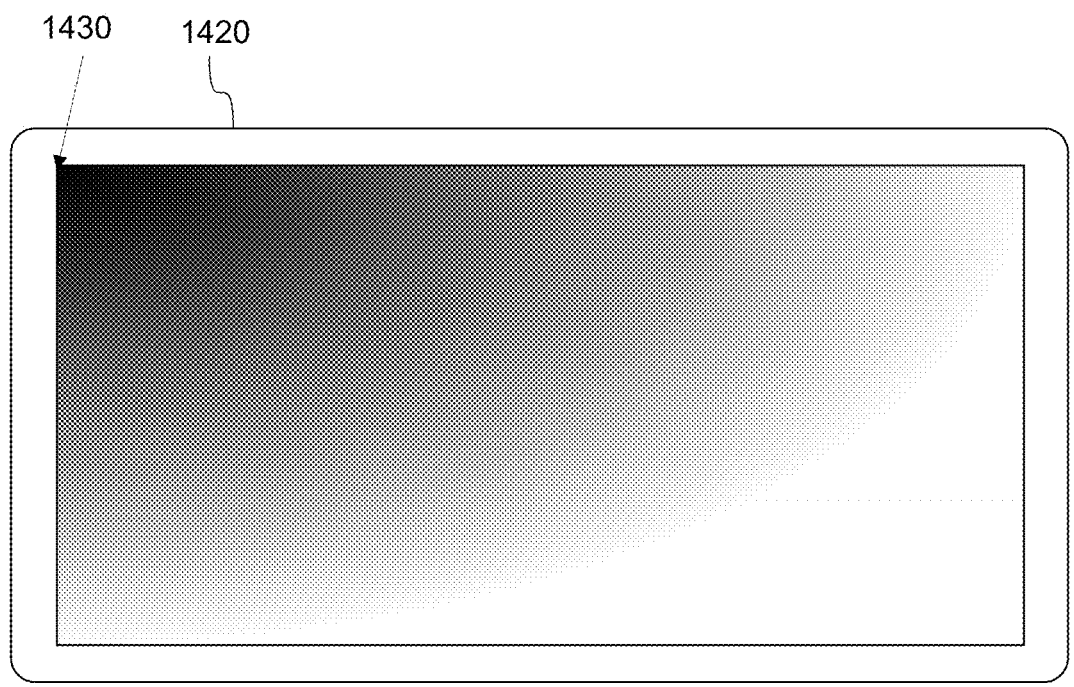

FIGS. 14A-B illustrate example gradient display areas in accordance with one or more illustrative aspects described herein.

FIG. 15 illustrates an example method of transmitting a display area in accordance with one or more illustrative aspects described herein.

FIG. 16 illustrates an example transmitted display area in accordance with one or more illustrative aspects described herein.

FIG. 17 illustrates an example method of transmitting a display region in accordance with one or more illustrative aspects described herein.

FIG. 18 illustrates an example transmitted display region in accordance with one or more illustrative aspects described herein.

Figure 19:
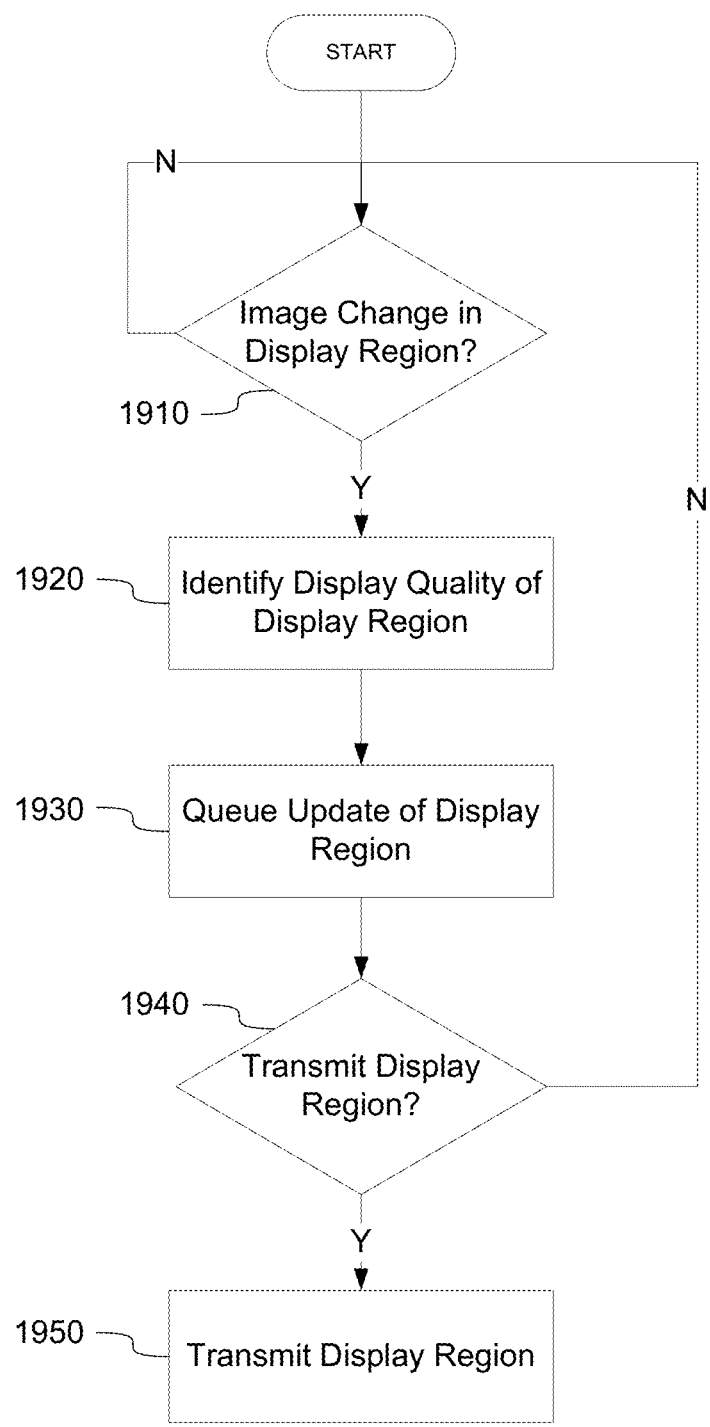

FIG. 19 illustrates another example method of transmitting a display region in accordance with one or more illustrative aspects described herein.

Figure 20:
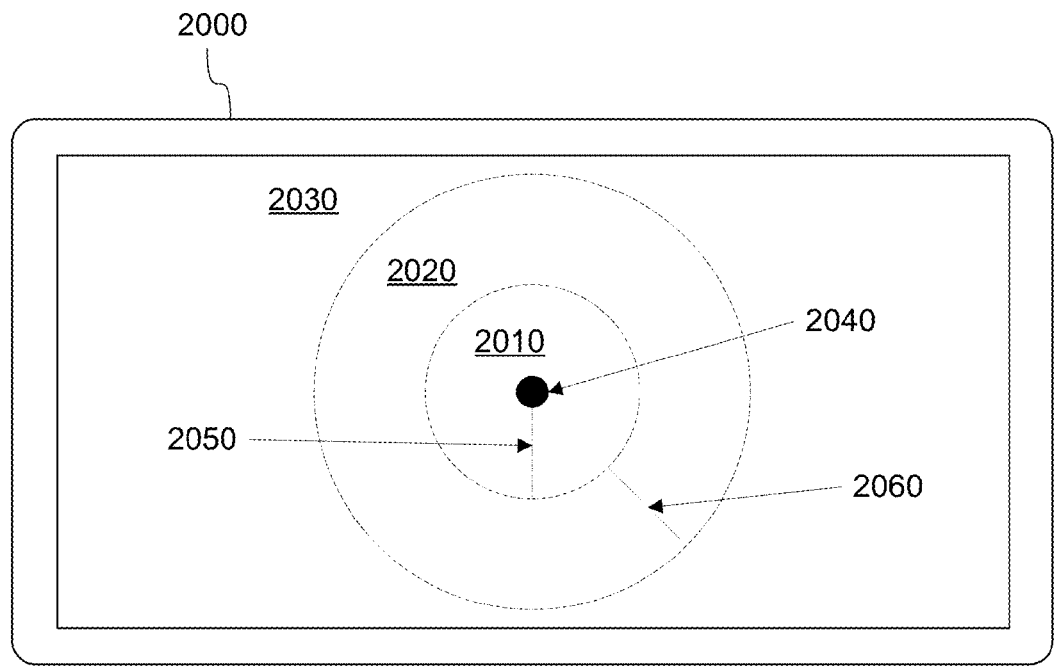

FIG. 20 illustrates an example display area with circular display regions in accordance with one or more illustrative aspects described herein.

Figure 21:
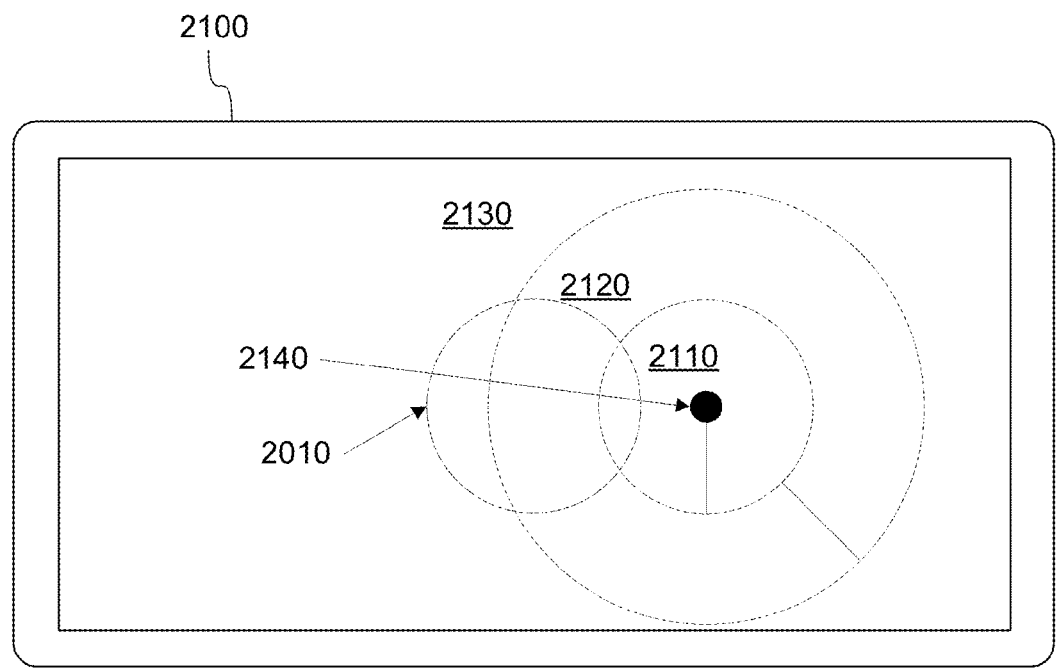

FIG. 21 illustrates another example display area with circular display regions in accordance with one or more illustrative aspects described herein.

Figure 22:
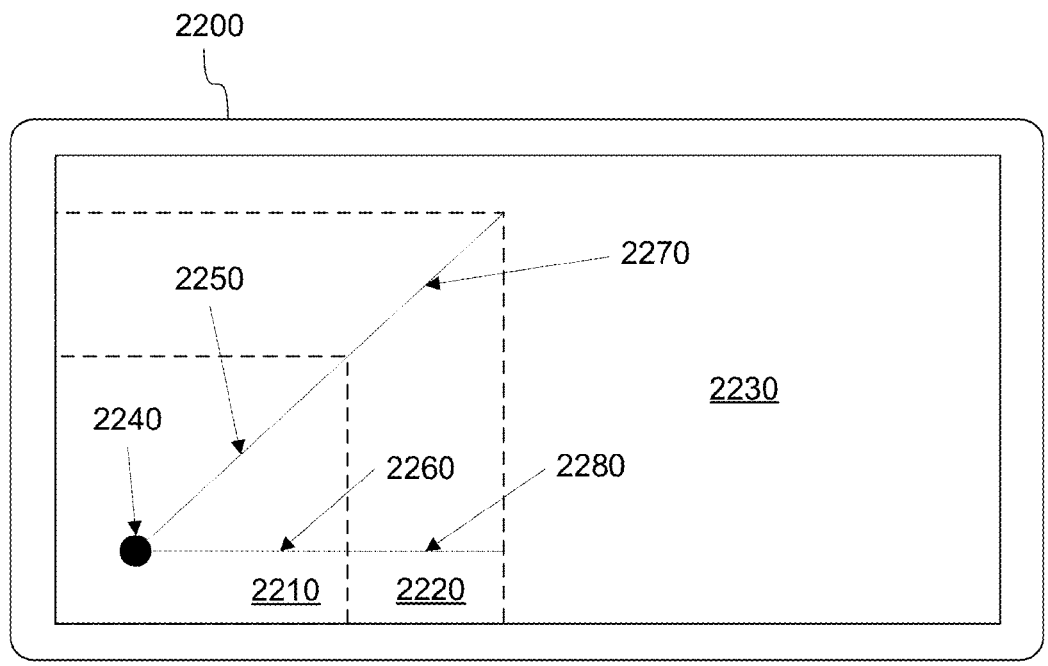

FIG. 22 illustrates an example display area with rectangular display regions in accordance with one or more illustrative aspects described herein.

Figure 23:
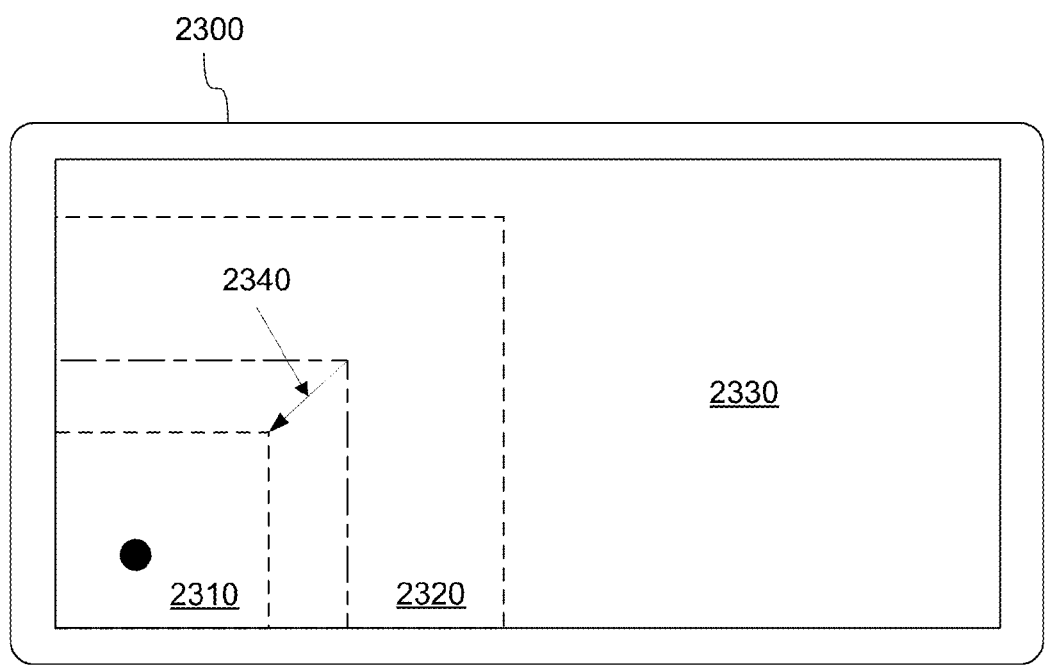

FIG. 23 illustrates another example display area with rectangular display regions in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In some embodiments, the computing environment 100 may include an appliance installed between the server(s) 106 and client machine(s) 140. The appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In some embodiments a single client machine 140 communicates with more than one server 106, while in other embodiments a single server 106 communicates with more than one client machine 140. In yet other embodiments, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In some embodiments, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server;

a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; those manufactured by International Business Machines; a processor such as those manufactured by Advanced Micro Devices; or any other combination of logic circuits. Still other embodiments of the central processing unit 321 may include any combination of the following: a microprocessor, a microcontroller, a central processing unit with a single processing core, a central processing unit with two processing cores, or a central processing unit with more than two processing cores.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In some embodiments, the processing unit 321 may comprise one or more parallel processing cores. The processing cores of the processing unit 321 may, in some embodiments, access available memory as a global address space, or in other embodiments, memory within the computing device 300 can be segmented and assigned to a particular core within the processing unit 321. In some embodiments, the one or more processing cores or processors in the computing device 300 can each access local memory. In still other embodiments, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-22n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; and WINDOWS 7; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc.; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The systems and architectures described above with reference to FIGS. 1-3, as well as other systems and architectures, may be used to implement the functionality described below. As a brief introduction, a display area may be divided into hierarchical or prioritized regions based on a present location of user focus (e.g., based on eye-tracking, mouse cursor position, window focus, etc.). Display data for the portion of the display area associated with the location of user focus may be transmitted from the server to the client with better image quality than portions of the display not associated with the location of user focus. For example, when a user is primarily focusing on one application window, e.g., a word processing application, the server might send higher quality display data for that window than the server sends for a second window that, while also visible, is not the focus of the user's attention.

FIG. 4 illustrates an example overview method of providing a hierarchical display in accordance with one or more illustrative aspects described herein. In some embodiments, one or more server(s), such as server(s) 106, may perform steps 410-440. In step 410, a server 106 may receive, such as from a client device 140 (e.g., from an application running on the client device, from a peripheral device connected to the client device, etc.), information identifying a position of a user's focus (e.g., where the user is looking). In some embodiments, the information may identify the position of the user's focus relative to the client device, such as relative to video display(s), display region(s), and/or position sensor(s) integrated with an/or connected to the client device. The information may be received by server 106 from client device 140 via one or more communication channels located in a network, such as LAN 125, WAN 129, and/or Internet. In some embodiments, server 106 may request position information from client device 140 and/or a peripheral device connected thereto. In other embodiments, a client device 140 and/or a peripheral device connected thereto may transmit position information without a request. For example, the information may be transmitted at predetermined periods (e.g., periodically, such as every X milliseconds). In some embodiments, the length of a predetermined time period may be a predefined time slice within a connection session (e.g., an ICA session) between server 106 and client device 140, such that the information is transmitted at the expiration of each time slice. The information may also be transmitted in response to an event (e.g., detection of a change in the position of the user's focus).

Any device, including server 106, client device 140, another computing device, a sensor, etc. may determine the position of the user's focus. For the sake of brevity, the disclosure will describe a client device, such as client device 140, as determining the position of the user's focus. Client device 140 may determine a position of a user's focus in several ways. For example, client device 140 may use a position sensor (e.g., a camera, such as an RGB camera, an IR camera, a 3-D camera, an audio sensor, such as a microphone, an eye-tracking device, or any other sensor configured to sense the position of a user's focus), detect a position of an input device indicator (e.g., a mouse cursor, text cursor, another pointer, etc.), and/or detect a position of another graphical user interface (GUI) element (e.g., an application window, such as an active or top-level application window). In some embodiments, client device 140 may determine a position of a user's focus by using a position sensor to track the user's position of focus (e.g., where the user is looking) Furthermore, client device 140 and/or a sensor may use the tracked position of focus to identify the position of a user's focus relative to a client device, such as relative to a video display having several display regions, and/or the position sensor (e.g., camera). For example, client device 140 may identify a set of user coordinates corresponding to the user's extremities (e.g., eyes, head, hands, elbows, torso, joints, etc.). Furthermore, client device 140 may create one or more image maps (e.g., an image map, depth map, audio map, etc.) and/or user skeleton models based on the set of coordinates identified by the sensor. In some embodiments, client device 140 may transmit information, such as the user coordinates, image maps, and/or user skeleton models to server 106. In some aspects the client device merely provides feedback to the server regarding a current location of user focus, e.g., by reporting the coordinates of interest to the session host or server, and the server then prioritizes the coordinates, determines display regions, and renders and schedules display regions for transmission.

After receiving the coordinate information, server 106 may prioritize one or several coordinates in the set of coordinates. In some embodiments, server 106 may prioritize one or more coordinates generally indicative of a position of a user's focus in a display area (e.g., eyes, head, and/or hands) over those generally not indicative thereof (e.g., elbows, torso, joints). For example, server 106 may prioritize coordinates corresponding to the user's eyes, in order to track, for example, the user's visual focus (e.g., a display region in a video display that the user is looking at). The user's eyes may be tracked using any eye tracking technique. For example, the user's eye position may be tracked by tracking the position of the user's pupil and/or iris. In some embodiments, the pupil and/or iris position may be determined by corneal-reflection tracking In this type of tracking, a light source, such as an infrared light source, may illuminate the cornea of the user's eyes, creating particular reflection patterns. The reflection patterns may subsequently be used by an image sensor, such as one configured to detect infrared light (e.g., a 3-D camera), to determine the position of the user's pupil and/or iris and therefore the position of the user's eyes. As another example, server 106 (or client 140) may determine coordinates corresponding to the user's head and/or hands in order to track, for example, the user's physical or visual focus. A position of the user's head may indicate the display region of the user's focus. For example, if the user's head is at the left half of the video display, it may be determined that the user is focusing on the left half of the display. Similarly, the position of the user's hands and/or fingers may, for example, indicate the position of the user's focus on a display, such as when the user points to a corresponding display region in the video display.

Instead of tracking a position of a user's focus via a position sensor, client device 140 may determine the position of a user's focus based on information readily available to the server, such as information generated in response to user activity in a virtual desktop and/or virtual application. For example, client device 140 may determine a position of a user's focus by detecting a position of an input device indicator, such as a mouse cursor, text cursor, or other pointer, as will be described in further detail in the examples below with respect to FIG. 10. Client device 140 may also determine a position of a user's focus by detecting a position of a GUI element, such as an application window that has input focus, as will be described in further detail in the examples below with respect to FIG. 11.

FIG. 5 illustrates an example of a user position in accordance with one or more illustrative aspects described herein. As illustrated, user 500 is positioned relative to a display area including three display regions, such as a first display region 520, a second display region 530, and a third display region 540. Although FIG. 5 illustrates an example display area with three display regions, one of ordinary skill in the relevant art will readily recognize that the display area may include any number of display regions. In FIG. 5, the user's focus 510, such as the focus of the user's eyes, is within the first display region 520. As previously described, a position sensor, such as a camera, may track the user's focus 510 such as a focus of the user's eyes (e.g., as within display region 520, as illustrated). In some embodiments, server 106 may prioritize display regions based on the detected focus of the user's eyes. For example, as will be described in further detail in the examples below, server 106 may rank the display regions in the display area based on the detected focus position of the user's eyes. As illustrated in FIG. 5, server 106 may rank the display regions, from most to least important, as follows: the first display region 520, the second display region 530, and the third display region 540. As will be described in further detail in the examples below, display region rank may additionally affect the display quality of each display region. In some instances, the user's focus 510 may span multiple display regions, such as display regions 520 and 530. In these instances, server 106 may rank display regions 520 and 530 at the same level. Alternatively, server 106 may select one of display regions 520 and 530 as having higher priority over the other.

FIG. 6 illustrates an example method of detecting a change in user position in accordance with one or more illustrative aspects described herein. FIG. 7 illustrates an example of a change in user position in accordance with one or more illustrative aspects described herein. In some instances, a change in position of a user's focus may cause server 106 to re-rank display regions. In step 610, server 106 may detect a change in the position of a user's focus. For example, referring to FIG. 7, user 700 may change his or her focus from a first position of user focus 710 (focus within first display region 720) to a second position of user focus 750 (focus within third display region 740), and server 106 may detect the change in step 610. In step 620, server 106 may determine whether the change in position of the user's focus meets and/or exceeds a predetermined movement threshold. In some embodiments, the predetermined threshold may depend on the location of one or more display regions. For example, in FIG. 7, the predetermined threshold may be a virtual boundary between two display regions, such as the boundary between first display region 720 and second display region 730. In this example, if the user's focus changes from within the first display region 720 to within the second display region 730, server 106 may determine that the change in position of the user's focus from the first display region 720 to the second display region 730 exceeds the predetermined threshold. Similarly, if the user's focus changes from within the first display region 720 to within the third display region 740, as illustrated in FIG. 7, server 106 may determine that the change in position of the user's focus exceeds the predetermined threshold in step 620. In step 630, in response to determining that the change in position exceeds the predetermined movement threshold, server 106 may re-rank (e.g., re-prioritize) display regions. For example, server 106 may re-rank by identifying display area 740 as the primary display region, display area 730 as the secondary display region, and display area 720 as the tertiary display region if the user's focus changes from within the first display region 720 to within the third display region 740. In some embodiments, where a client device and/or sensor connected to the client device tracks the position of a user's focus, the client device and/or sensor may transmit the updated position of the user's focus to server 106 in response to determining that the change in position exceeds the predetermined movement threshold.

Returning to FIG. 4, in step 420, server 106 may rank a plurality of display regions based on a detected and/or received position of the user's focus. FIG. 8 illustrates an example method of ranking display regions in accordance with one or more illustrative aspects described herein. In step 810, server 106 may determine the type of user tracking to use to rank display regions. As previously described, types of user tracking include, but are not limited to, use of a position sensor (e.g., a camera), tracking a position of an input device indicator (e.g., a mouse cursor), and detecting the position of another GUI element (e.g., an application window). For example, returning to FIG. 7, the user's eyes may be focused on an area within display region 720, a mouse cursor may be within display region 730, and an in-focus application window may be within display region 740. Then, if server 106 determines, in step 810, that mouse cursor tracking is used, server 106 may prioritize display region 730 over display regions 720 and 740. In step 820, based on the tracking type (e.g., mouse cursor tracking), server 106 may determine a primary display region, such as a display region that includes the position of the user's focus (e.g., display region 730 if a mouse cursor is within display region 730). In step 830, server 106 may determine one or more secondary display regions. In some embodiments, the secondary display region may be adjacent to the primary display region. In step 840, server 106 may determine one or more tertiary display regions. In some embodiments, the tertiary display region may be farther from the primary display region than the secondary display region is to the primary display region in a display area. In additional aspects, the tertiary display region may be adjacent to the secondary display region. Although the foregoing steps include determination of primary, secondary, and tertiary display regions, server 106 might not determine a tertiary display region. For example, in the illustration of FIG. 7, where the display area is divided into three display regions 720, 730, and 740, server 106 may determine display region 730 as the primary display region, and display regions 720 and 740 both as secondary display regions. Furthermore, a display area is not limited to three display regions. Rather, server 106 may divide a display area into any number of display regions.

FIG. 9 illustrates an example display area 900 including a plurality of display regions in accordance with one or more illustrative aspects described herein. As illustrated, server 106 might divide display area 900 into five regions. Server 106 may determine that display region 910 is the primary display region (e.g., if a position of the user's focus is within display region 910). Server 106 may also determine that display region 920, illustrated as the two regions adjacent to primary display region 910, is the secondary display region. Server 106 may additionally determine that display region 930, illustrated as the two regions adjacent to secondary display region 920, is the tertiary display region. In the example display area 900, secondary display region 920 may be closer to primary display region 910 than the tertiary display region 930 is to primary display region 910. Although FIG. 9 represents display area 900 as a display area in a single monitor, display area 900 may span multiple monitors. In a multi-monitor system, display area 900 may be divided into several display regions. For example, each monitor may include one display region (e.g., 3 display regions in a 3 monitor system). Alternatively, each monitor may include multiple display regions (e.g., 9 display regions in a 3 monitor system if each monitor has 3 display regions).

FIG. 10 illustrates another example display area 1000 including a plurality of display regions in accordance with one or more illustrative aspects described herein. In this example, server 106 may determine that an input device indicator, such as a mouse cursor 1040, is within a predetermined display region 1010. In response to this determination, server 106 may determine that the display region 1010 is primary display region. Server 106 may determine that predetermined display region 1020, illustrated as a region surrounding primary display region 1010, is the secondary display region. Server 106 may additionally determine that predetermined display region 1030, illustrated as a region adjacent to secondary display region 1020, is the tertiary display region. Although the position of the plurality of display regions may be predetermined (e.g., the position of display regions do not change in response to a change in position of cursor 1040), the plurality of display regions need not be predetermined. Instead, server 106 may determine the position and size of the plurality of display regions (e.g., 1010, 1020, and 1030) in response to detecting the position of cursor 1040. In some embodiments, server 106 may determine that primary display region 1010 extends a predetermined number of pixels above, to the right, below, and to the left of a portion, such as the tip or a center of mass, of cursor 1040. For example, server 106 may determine that primary display region 1010 extends 200 pixels above, to the right, below, and to the left of the center of mass of cursor 1040. In this example, the primary display region 1010 would include a region 400 pixels in height and 400 pixels in width. Server 106 may similarly determine the position and size of secondary display region 1020 and tertiary display region 1030. For example, secondary display region 1020 may extend an additional 200 pixels from each side of primary display region 1010, and tertiary display region 1030 may extend an additional 200 pixels from each side of secondary display region 1020. Alternatively, server 106 may determine that the remainder of display area 1000 is the tertiary display region 1030.

FIG. 11 illustrates an additional example display area 1100 including a plurality of display regions in accordance with one or more illustrative aspects described herein. Server 106 may rank display regions based on the positions of other GUI elements, such as application windows. In some embodiments, server 106 may track an order of overlap of GUI elements, such as by maintaining a z-order of application windows or tracking which window has input focus, and rank display regions based on the order of overlap. For example, server 106 may determine that a display region that includes and/or consists of application window 1110 (e.g., the top window in a z-order) is the primary display region. Server 106 may determine that a display region that includes and/or consists of application window 1120 (e.g., a window adjacent to the top window in the z-order) or a portion visible to the user thereof is the secondary display region. Server 106 may similarly rank regions including or consisting of additional application windows. In FIG. 11, which includes two application windows, server 106 may determine that the remainder of display area 1100 (e.g., display region 1130) is the tertiary display region. In other embodiments, server 106 may determine that regions that include or consist of any application windows visible to the user are the primary display region and all other regions are the secondary display region. For example, server 106 may determine that the display region including and/or consisting of application windows 1110 and 1120 or portions visible thereof are the primary display region and that the background region 1130 is the secondary display region.

Server 106 may also divide a single application window into multiple display regions. In some embodiments, server 106 may divide the application window based on pre-existing logical divisions in the application. For example, in a free-hand drawing application, server 106 may determine that a display region that includes and/or consists of the canvas area of the drawing application is the primary display region. Server 106 may determine that a display region that includes and/or consists of other areas of the drawing application, such as the toolbar, menu bar, framework region, etc., is the secondary display region. Server 106 may also determine that a display region that includes and/or consists of the remainder of the display area is the tertiary display region. In additional embodiments, server 106 may divide the application window based on a position (e.g., coordinate) of the user's focus. For example, if the user's eyes are focused on a particular coordinate within the drawing application, server 106 may determine that a display region that includes and/or consists of the coordinate and a circular region extending a predetermined radius from the coordinate is the primary display region. Server 106 may also determine that the remainder of the drawing application is the secondary display region.

In some embodiments, server 106 may rank display regions based on a predetermined ranking of applications and/or application windows. For example, server 106 may pre-rank three applications in the following priority order: Application A, Application B, and Application C. Accordingly, display region rank may be based on this pre-rank of applications. For example, if windows for Applications A, B, and C are open, server 106 may determine that the display region that includes and/or consists of Application A (or a portion thereof visible to a user) is the primary display region, the display region that includes and/or consists of Application B (or a portion thereof visible to a user) is the secondary display region, and/or the display region that includes and/or consists of Application C (or a portion thereof visible to a user) is the tertiary display region. In some instances, only a subset of the pre-ranked application might be open and/or running For example, where only Applications A and C are open, server 106 may determine that the display region including and/or consisting of Application A is the primary display region, the display region including and/or consisting of Application C is the secondary display region, and the remainder of the display area is the tertiary display region. In additional embodiments, server 106 may rank display regions based on application and/or application window whitelisting and/or blacklisting. For example, server 106 may generate an application whitelist (or receive one from a user) and grant applications on the application whitelist primary display region status. Similarly, server 106 may generate an application blacklist (or receive one from a user) and grant applications on the application blacklist secondary, tertiary, etc. display region status. The application whitelist may include applications with frequent image changes, such as a video player application or applications generally requiring presentation of a high resolution image, such as a photo-editing application. On the other hand, the application blacklist may include applications with infrequent image changes, such as a file manager window, or applications generally not requiring presentation of a high resolution image, such as a desktop taskbar. Multiple lists may be generated and/or received by server 106. For example, server 106 may generate a first list of application granted primary display region status, a second list of application granted secondary display region status, and a third list of applications granted tertiary display region status. Any number of application lists may be generated and/or received.

FIG. 12 illustrates an example method of determining a plurality of primary display regions in accordance with one or more illustrative aspects described herein. FIG. 13 illustrates an example display area including a plurality of primary display regions in accordance with one or more illustrative aspects described herein. In step 1210, server 106 may determine that multiple primary display regions exist, such as when more than one user or more than one user focus position is tracked. For example, the server 106 may determine that a first user's focus is in display region 1310 and that a second user's focus is in display region 1320, such as based on feedback from a client device and/or sensor. Alternatively, the server 106 may determine that a single user is focusing on multiple positions in display area 1300. This determination may be made based on one or more user tracking types. For example, server 106 may determine that the user's focus is on an area within display region 1310 if user's eyes are focused on an area within display region 1310 and that the user's focus is also on an area within display region 1320 if the position of an input device indicator, such as a cursor, is within display region 1320. As another example, server 106 may determine that the user is focusing on display region 1310 based on an application window being located at display region 1310 and that the user if also focusing on display region 1320 based on another application window being located at display region 1320. Server 106 may make such a determination based on any of the focus tracking techniques previously described, including use of a position sensor (e.g., camera, etc.), tracking a position of an input device indicator (e.g., a mouse cursor, etc.), detecting the position of a graphical user interface (GUI) element (e.g., an application window, etc.), or a combination thereof. In step 1220, server 106 may determine a first primary display region (e.g., display region 1310) based on a first focus position. In step 1230, server 106 may determine a second primary display region (e.g., display region 1320) based on a second focus position. In step 1240, server 106 may identify additional display regions (e.g., display region 1330) as secondary, tertiary, etc. display regions. Although the foregoing description includes two primary display regions, a display area may include any number of primary display regions.

FIGS. 14A-B illustrate example gradient display areas in accordance with one or more illustrative aspects described herein. In the example display area 1400, a position of a user's focus may be near the center of the display area 1400 as depicted by reference number 1410. Server 106 may prioritize a display region including the position of the user's focus, along a vertical of display area 1400. Regions moving away from the region of a user's focus may receive lower priority in a gradient fashion. In the example display area 1420, a position of a user's focus may be near the top left corner of display area 1420 as depicted by reference number 1430. Server 106 may prioritize a display region including the position of the user's focus, at a point in display area 1420. Regions moving away from the region of a user's focus, such as in a circular fashion, may receive lower priority in a gradient fashion.

FIG. 20 illustrates an example display area 2000 with circular display regions 2010, 2020, and 2030 in accordance with one or more illustrative aspects described herein. The position of the user's focus may be the coordinate indicated by reference 2040. Based on the coordinate, server 106 may dynamically determine a primary display region 2010 that extends a predetermined distance 2050 (e.g., X pixels) from coordinate 2040 in a radial fashion, forming circular primary display region 2010. Server 106 may also dynamically determine a secondary display region 2020 that extends an additional predetermined distance 2060 (e.g., Y pixels) from coordinate 2040 in a radial fashion, forming circular secondary display region 2020. Predetermined distances 2050 and 2060 may be the same or different lengths. Server 106 may determine that the remainder of display area 2000 is the tertiary display region 2030. In some embodiments, server 106 may dynamically generate circular display regions if the position of the user's focus is within a central area (e.g., a non-corner area) of the display area 2000.

FIG. 21 illustrates another example display area 2100 with circular display regions 2110, 2120, and 2130 indicating a shift in the position of the user's focus from coordinate 2040, illustrated in FIG. 20, to coordinate 2140, illustrated in FIG. 21, in accordance with one or more illustrative aspects described herein. In some embodiments, a predetermined movement threshold to cause a change or reassignment of display regions may be a virtual boundary between two display regions. For example, if the position of a user's focus changes from an area within original primary display region 2010 to an area outside the region (e.g., from position 2040 to position 2140), server 106 may determine that the shift in focus position exceeds the movement threshold and may reassign the display regions accordingly. For example, as illustrated in FIG. 21, server 106 may generate a new primary display region 2110, a new secondary display region 2120, and a new tertiary display region 2130 in response to the shift in position.

FIG. 22 illustrates an example display area 2200 with rectangular display regions 2210, 2220, and 2230 in accordance with one or more illustrative aspects described herein. Similar to example display area 2000, server 106 may dynamically determine the primary, secondary, and tertiary display regions based on a position of the user's focus (e.g., coordinate 2240). In some embodiments, primary display region 2210 may extend a predetermined diagonal distance 2250 from focus position 2240, forming the square display region. In other embodiments, primary display region 2210 may extend a predetermined horizontal (and/or vertical) distance 2260 from focus position 2240, forming the square or rectangular display region. Similarly, secondary display region 2220 may extend an additional diagonal distance 2270 or horizontal (and/or vertical) distance 2280 from focus position 2240, forming the square or rectangular display region. Server 106 may determine that the remainder of display area 2000 is the tertiary display region 2230. In some embodiments, server 106 may create rectangular display regions if the position of the user's focus is within a corner area of the display area.

FIG. 23 illustrates another example display area 2300 with rectangular display regions 2310, 2320, and 2330 in accordance with one or more illustrative aspects described herein. In some embodiments, server 106 may update the size of one or more display regions based on bandwidth availability. If network bandwidth decreases (e.g., caused by increased network traffic), server 106 may detect this decrease and reduce the amount of information transmitted to the client device. The amount of information may be reduced by, for example, decreasing the size of the primary display region 2310 (as indicated by arrow 2340), which is generally transmitted at a higher display quality than other display regions. Server 106 may similarly reduce the amount of information transmitted by, for example, decreasing the size other display regions (e.g., display regions transmitted at higher qualities) or decreasing the display quality of one or more display regions, as will be described in further detail in the examples described below. Server 106, on the other hand, may increase the amount of information transmitted, such as by increasing the size of primary display region 2310, if server 106 detects an increase in bandwidth.

Returning to FIG. 4, in step 430, server 106 may determine the display quality for the display regions ranked in step 420. In some aspects of the disclosure, display quality of a display region may correspond to the rank of the display region. For example, a primary display region may be assigned a high display quality, the secondary display region may be assigned a medium display quality, and the tertiary display region may be assigned a low display quality. Display quality may depend on several factors. In some embodiments, display quality may be adjusted by adjusting an image transmission rate, such as an image refresh rate. Generally, server 106 may transmit higher-ranked display regions at a greater frequency. Frame transmission rate for each display region may also depend on the type of network connecting server 106 and client device 140 (e.g., LAN, WAN, etc.). For example, in a LAN environment, server 106 may transmit frames including primary display regions at 25 to 30 frames per second, frames including secondary display regions at 20 to 25 frames per second, and frames including tertiary display regions at 15 to 20 frames per second. Where the display area includes additional display regions, server 106 may transmit those frames at, for example, 10 to 15 frames per second or fewer than 10 frames per second. In a WAN environment, server 106 may transmit frames at rates similar to those described above with respect to LAN environments. Server 106 may also adjust the transmission rates based on prevailing conditions (e.g., amount of traffic, bandwidth availability, security, etc.).

In some embodiments, display quality may be adjusted by adjusting a detail level of an image, such as by adjusting an image resolution. For example, server 106 may transmit frames including primary display regions at a first resolution, frames including secondary display regions at a second resolution lower than the first resolution, and frames including tertiary display regions at a third resolution lower than the second resolution. Server 106 may adjust the horizontal resolution, vertical resolution, or a combination thereof, to a fraction of a full resolution, such as ½ of full horizontal resolution, ¼ of full horizontal resolution, ½ of full vertical resolution, and/or ¼ of full vertical resolution, and transmit frames based on the corresponding resolution. For example, server 106 may transmit frames including primary display regions at full vertical and horizontal resolutions, frames including secondary display regions at ½ horizontal resolution and full vertical resolution, and frames including tertiary display regions at ¼ horizontal resolution and full vertical resolution. In some embodiments, server 106 may adjust color space resolutions, the color space including image luma and chroma information. In these embodiments, server 106 may adjust the detail level of the luma, the detail level of the chroma, or a combination thereof in the manner described above (e.g., full resolution, ½ resolution, etc.). In some embodiments, display quality may also be adjusted by adjusting a degree of image compression (e.g., ranging from 8 to 14 bits per sample). For example, server 106 may transmit frames including primary display regions at a first degree of compression, frames including secondary display regions at a second degree of compression greater than the first degree of compression, and frames including tertiary display regions at a third degree of compression greater than the second degree of compression.

Display quality may be adjusted by combining any of frequency of transmission, detail level, and/or degree of image compression. In some embodiments, server 106 may determine an image quality value (e.g., a value ranging from 0 to 100, 100 being the highest display quality) that indicates the resolution and amount of image compression for each display region. An image quality value of 80 to 100 may indicate a high display quality (e.g., a quality where the user sees no distortion), an image quality value of 60 to 80 may indicate a medium display quality (e.g., a quality where the user sees some, but minimal distortions), etc. Additionally, server 106 may determine a transmission rate for each display region assigned an image quality value.

In some embodiments, display quality may depend on the type of image or video encoding utilized by server 106. Each encoding type may provide several adjustable parameters that affect display quality (e.g., parameter 1, parameter 2, and parameter 3). Server 106 may determine, for each display region, the level (e.g., high, medium, and low, where high indicates the highest level for a given parameter) of each parameter and adjust the display quality parameters accordingly. For example, server 106 may transmit frames including primary display regions at a high level for parameter 1, high level for parameter 2, and a high level for parameter 3. Similarly, server 106 may transmit frames including secondary display regions at a high level for parameter 1, a medium level for parameter 2, and a medium level for parameter 3. Any combination of parameter levels may be determined for any of the display regions, such that the higher ranked the display region, the higher the display quality. In adjusting the parameter levels, server 106 may additionally consider the amount of available memory and the computing power at the server or client device or the bandwidth of the network. As a representative example, server 106 may utilize H.264 encoding. H.264 includes several parameters, including (1) weighted prediction, which may be turned on (e.g., high level) or off (e.g., low level), (2) subpixel motion estimation, which may be set to 1, 4, 5, or 6, (3) reference frames, which may be set to 1 or 4, and (4) motion estimation, which may be set to diamond motion estimation ("DIA"), hexagon motion estimation ("HEX"), uneven multihexagon motion estimation ("UMH"), and successive elimination exhaustive search motion estimation ("ESA"). Server 106 may adjust H.264 parameters for each display region based on the rank of the display region.

In step 440, server 106 may transmit at least one display region to a client device 140 based on the rank and display quality of one or more display regions as determined by server 106 in steps 420 and 430, respectively. In some embodiments, server 106 may transmit a display area that includes a plurality of display regions to a client device. FIG. 15 illustrates an example method of transmitting a display area in accordance with one or more illustrative aspects described herein. FIG. 16 illustrates an example transmitted display area in accordance with one or more illustrative aspects described herein. In step 1510, server 106 may generate a primary display region, such as display region 1610, at a first display quality. For example, server 106 may generate region 1610 at a first resolution (e.g., high resolution), at a first degree of compression (e.g., a low degree of compression), or a combination thereof. In step 1520, server 106 may generate a second display region, such as display region 1620, at a second display quality. For example, server 106 may generate region 1620 at a second resolution (e.g., medium resolution), at a second degree of compression (e.g., a medium degree of compression), or a combination thereof. In step 1530, server 106 may generate a tertiary display region, such as display region 1630, at a third display quality. For example, server 106 may generate region 1630 at a third resolution (e.g., low resolution), at a third degree of compression (e.g., a high degree of compression), or a combination thereof. In step 1540, server 106 may combine primary display region 1610, secondary display region 1620, and tertiary display region 1630 generated at their respective image qualities. For example, server 106 may generate a single display area by concatenating display regions 1610, 1620, and 1630. In step 1550, server 106 may transmit display area 1600 (e.g., concatenated display regions 1610, 1620, and 1630) to the client device. Alternatively, server 106 might not concatenate display regions 1610, 1620, and 1630, but may instead separately transmit display regions 1610, 1620, and 1630 to the client device. A client application running at the client device may render the display area, including display regions 1610, 1620, and 1630 based on received application display data.

In some embodiments, server 106 may transmit display regions individually to a client device. FIG. 17 illustrates an example method of transmitting a display region in accordance with one or more illustrative aspects described herein. FIG. 18 illustrates an example transmitted display region in accordance with one or more illustrative aspects described herein. In step 1710, server 106 may generate a primary display region, such as display region 1810. To generate primary display region 1810, server 106 may identify a first corner, such as top right corner 1801, of primary display region 1810 and the size of the primary display region 1810 (e.g., as it extends to a bottom left corner 1802). Alternatively, server 106 may detect a display region that includes and/or consists of an application window to generate primary display region 1810. Such may be the case where an application window spans the entire display region 1810. In step 1720, server 106 may determine the display quality (e.g., transmission rate, detail level, and/or degree of image compression) of primary display region 1810. In step 1730, server 106 may transmit primary display region 1810 to a client device at the determined display quality. For example, where display quality varies by degree of image compression, image resolution, or a combination thereof, server 106 may transmit primary display region 1810 to a client device at a first degree of image compression (e.g., low degree of image compression), a first image resolution (e.g., high resolution), or a combination thereof. Server 106 may generate and transmit secondary display region 1820 and tertiary display region 1830 in a similar manner. For example, server 106 may transmit secondary display region 1820 to a client device at a second degree of image compression (e.g., medium degree of image compression), a second image resolution (e.g., medium resolution), or a combination thereof. Similarly, server 106 may transmit tertiary display region 1830 to a client device at a third degree of image compression (e.g., high degree of image compression), a third image resolution (e.g., low resolution), or a combination thereof. Server 106 may transmit the display regions at the same time (e.g., in the same data packet), sequentially, or at different times (e.g., at different refresh rates as will be described in further detail in the examples below).

In some embodiments, where display quality varies by transmission (e.g., refresh) rate, server 106 may transmit primary display region 1810 at a corresponding transmission rate. For example, if primary display region 1810 has a transmission rate of 30 frames per second, server 106 may generate an updated frame of primary region 1810 and transmit the update at 30 frames per second. In some embodiments, the transmitted image may have a corresponding degree of image compression and/or image resolution, represented by, for example, an image quality value ranging from 0 to 100. For example, server 106 may transmit updates of primary display region 1810 at 30 frames per second and at an image quality value of 80 (e.g., at a full resolution and a medium degree of compression). Server 106 may similarly generate and transmit updates of secondary display region 1820 at 20 frames per second and at an image quality value of 60 (e.g., at a full horizontal resolution and a ½ vertical resolution and a medium degree of compression). Server 106 may generate and transmit updates of tertiary display region 1830 at 15 frames per second and at an image quality value of 50 (e.g., at a full horizontal resolution and a ½ vertical resolution and a high degree of compression).

FIG. 19 illustrates another example method of transmitting a display region in accordance with one or more illustrative aspects described herein. In step 1910, server 106 may detect an image change in one or more display region. For example, if a display region includes a word processing application, an image change may occur when the user types text into the word processing application. An image change may similarly occur when a GUI element (e.g., mouse cursor, application window, etc.) in the display region shifts positions, such as when a user drags the element from one area of the display region to another. Upon detection of an image change, server 106, in step 1920, may identify the display quality of the display region having the image change. For example, if the image change occurred in a primary display region, server 106 may identify the display quality as high transmission rate, high image resolution, low degree of image compression, or a combination thereof. As another example, if the image change occurred in a secondary display region, server 106 may identify the display quality as a medium transmission rate, medium image resolution, medium degree of image compression, or a combination thereof. In step 1930, server 106 may generate and/or queue, for transmission, an updated frame of the display region having the image change. For example, server 106 may add a frame of the display region to a display buffer.

In step 1940, server 106 may determine whether to transmit the updated frame to the client device. This determination may depend on the display quality of the display region having the image change. For example, if server 106 detects an image change in the secondary display region, server 106 may determine to prevent transmission of the updated frame of the secondary display region by tossing the frame added to the queue in step 1930. Subsequently, server 106 may return to step 1910 to wait for another image change. Alternatively, if server 106 detects an image change in the primary display region, server 106, in step 1950, may determine to transmit the updated frame of the primary display region by transmitting the primary display region queued in step 1930. In some embodiments, updated frames for display regions higher in rank may be transmitted more frequently than updated frames for display regions lower in rank. For example, server 106 may transmit an updated frame for a primary display region for every image change that occurs in the primary display region and transmit an updated frame for a secondary display region for every other image change that occurs in the secondary display region.

Although example embodiments are described above, the various features and steps may be combined, divided, omitted, and/or augmented in any desired manner, and other steps may be added, depending on the specific recommendation process desired. The scope of this patent should only be defined by the claims that follow.

What is claimed:

1. One or more non-transitory computer-readable media having computer-executable instructions stored thereon that, when executed by a processor, cause the processor to:
receive, from a client device, information identifying a position of a user focus within a display area, wherein the position of the user focus is determined based on an image captured by a camera associated with the client device;
determine, based on the information identifying the position of the user focus within the display area, a primary display region of the display area corresponding to the position of the user focus;
determine a secondary display region different from the primary display region; transmit, to the client device, a frame of the primary display region; and
in response to detecting an image change in the secondary display region, prevent transmission of a frame of the secondary display region based on a determination that the secondary display region does not correspond to the position of the user focus.

2. The one or more non-transitory computer-readable media of claim 1, wherein
transmitting the frame of the primary display region comprises transmitting the frame of the primary display region with a first display quality, and wherein the one or more non-transitory computer-readable media has computer-executable instructions stored thereon that, when executed by the processor, cause the processor to:
transmit a second frame of the secondary display region with a second display quality, the first display quality being higher than the second display quality.

3. The one or more non-transitory computer-readable media of claim 1, having computer-executable instructions stored thereon that, when executed by the processor, cause the processor to:
determine a tertiary display region of the display area, wherein
the secondary display region is closer to the primary display region than the tertiary display region is to the primary display region, and wherein
a display quality of the secondary display region is higher than a display quality of the tertiary display region.

4. The one or more non-transitory computer-readable media of claim 1,
wherein preventing transmission of the frame of the secondary display region comprises discarding the frame of the secondary display region from a queue.

5. The one or more non-transitory computer-readable media of claim 1, wherein a display quality of each of the primary display region and the secondary display region comprises one or more of an image resolution, an image transmission rate, or a degree of image compression.

6. The one or more non-transitory computer-readable media of claim 1, having computer-executable instructions stored thereon that, when executed by the processor, cause the processor to:
receive, from the client device, updated information identifying a second position of the user focus indicating a change in the position of the user focus by more than a predetermined threshold; and
determine a new primary display region of the display area based on the updated information indicating the change in position of the user focus.

7. The one or more non-transitory computer-readable media of claim 1, having computer-executable instructions stored thereon that, when executed by the processor, cause the processor to:
determine, based on the image captured by the camera, a position of the user's eyes, head, or hands; and
determine, as the position of the user's eyes, head, or hands, the position of the user focus, wherein determining the primary display region comprises determining the primary display region corresponding to the determined position of the user focus.

8. The one or more non-transitory computer-readable media of claim 1, wherein the position of the user focus is additionally determined based on one or more of a position of an input device indicator in the display area or a window focus in the display area.

9. A method comprising:
receiving, from a client device, information identifying a position of a user focus in a display area, wherein the position of the user focus is determined based on an image captured by a camera associated with the client device;
determining a primary display region of the display area, the primary display region being associated with the position of the user focus in the display area;
determining a secondary display region different from the primary display region;
setting a display quality of the primary display region higher than a display quality of the secondary display region;
transmit, to the client device, a frame of the primary display region; and
in response to detecting an image change in the secondary display region, preventing transmission of a frame of the secondary display region based on a determination that the secondary display region does not correspond to the position of the user focus.

10. The method of claim 9, further comprising:
determining a tertiary display region of the display area, wherein the secondary display region is closer to the primary display region than the tertiary display region is to the primary display region; and
setting the display quality of the secondary display region higher than a display quality of the tertiary display region.

11. The method of claim 9, wherein preventing transmission of the frame of the secondary display region comprises discarding the frame of the secondary display region from a queue.

12. The method of claim 9, wherein the display quality of the primary display region comprises one or more of an image resolution, an image transmission rate, or a degree of image compression.

13. The method of claim 9, further comprising:
receiving, from the client device, updated information identifying a second position of the user focus indicating a change in the position of the user focus from the primary display region to a display region different from the primary display region; and
determining a new primary display region of the display area based on the updated information indicating the change in position of the user focus.

14. The method of claim 9, further comprising determining that the position of the user focus has changed to a new display region in the display area based on one or more of a determination that a position of an input device indicator associated with the user focus has changed to a position in the new display region or a determination that at least a portion of an application window is within the new display region.

15. The method of claim 9, further comprising determining that the position of the user focus has changed to a new display region in the display area based on a determination, based on a second image captured by the camera, that a position of the user's eyes, head, or hands has changed from focusing on the primary display region to focusing on the new display region.

16. The method of claim 9, further comprising:
receiving, from the client device, information identifying a position of another user focus in the display area;
determining another primary display region of a display area, the another primary display region being associated with the position of the another user focus; and
setting the display quality of the another primary display region to the display quality of the primary display region.

17. The method of claim 9, wherein
transmitting the frame of the primary display region is performed in response to detecting an image change in the primary display region.

18. A system, comprising:
a client device comprising:
a display screen configured to display a display area, the display area comprising a first display region and a second display region; and
a camera configured to capture images at a location of the client device; and
a server comprising:
a processor; and
memory having computer-executable instructions stored thereon that, when executed by the processor, cause the processor to:
determine, based on an image of a user captured by the camera, that a position of a user's focus within the display area has changed from the second display region to the first display region;
assign a first transmission rate to the first display region;
assign a second transmission rate to the second display region, the second transmission rate lower than the first transmission rate;
transmit, to the client device, frames of the first display region at the first transmission rate; and
transmit, to the client device, frames of the second display region at the second transmission rate, wherein transmission of the frames of the second display region at the second transmission rate includes, in response to detecting an image change in the second display region, preventing transmission of one or more frames of the second display region based on the determining that the position of the user's focus within the display area has changed from the second display region to the first display region.

19. The one or more non-transitory computer-readable media of claim 1, wherein transmitting the frame of the primary display region comprises transmitting the frame of the primary display region at a first image transmission rate and at a first display quality comprising one or more of a first image resolution or a first degree of image compression, wherein the one or more non-transitory computer-readable media has computer-executable instructions stored thereon that, when executed by the processor, cause the processor to:
transmit a second frame of the secondary display region at a second image transmission rate lower than the first image transmission rate and at a second display quality comprising one or more of a second image resolution lower than the first image resolution or a second degree of image compression lower than the first degree of image compression.

20. The method of claim 9, further comprising:
determining a second primary display region of the display area based on a second position of the user focus in the display area, wherein the second position of the user focus in the display area is determined based on one or more of a position of an input device indicator in the display area or a window focus in the display area.

* * * * *